US012742225B2

(12) United States Patent
Wang

(10) Patent No.: US 12,742,225 B2
(45) Date of Patent: Sep. 22, 2026

(54) METHOD FOR SEPARATING NICKEL FROM LITHIUM, AND APPLICATION THEREOF

(71) Applicant: SUZHOU BOTREE CYCLING SCI & TECH CO., LTD, Suzhou (CN)

(72) Inventor: Xue Wang, Suzhou (CN)

(73) Assignee: SUZHOU BOTREE CYCLING SCI & TECH CO., LTD, Suzhou (CN)

( * ) Notice: Subject to any disclaimer, the term of this patent is extended or adjusted under 35 U.S.C. 154(b) by 688 days.

(21) Appl. No.: 18/026,560

(22) PCT Filed: Jul. 12, 2021

(86) PCT No.: PCT/CN2021/105653

§ 371 (c)(1),
(2) Date: Mar. 15, 2023

(87) PCT Pub. No.: WO2022/057412

PCT Pub. Date: Mar. 24, 2022

(65) Prior Publication Data

US 2023/0332265 A1 Oct. 19, 2023

(30) Foreign Application Priority Data

Sep. 18, 2020 (CN) ........................ 202010986175.X

(51) Int. Cl.

*C22B 3/32* (2006.01)
*C22B 3/00* (2006.01)
*C22B 7/00* (2006.01)
*C22B 26/12* (2006.01)
*H01M 10/54* (2006.01)

(52) U.S. Cl.

CPC ................ *C22B 3/32* (2021.05); *C22B 7/006* (2013.01); *C22B 23/0453* (2013.01); *C22B 26/12* (2013.01); *H01M 10/54* (2013.01)

(58) Field of Classification Search

CPC .......... C22B 3/32; C22B 3/322; C22B 3/324; C22B 3/326; C22B 23/04; C22B 23/0407; C22B 23/0415; C22B 23/0453; C22B 23/0461; C22B 23/0476; C22B 23/0484; C22B 26/12

See application file for complete search history.

(56) References Cited

U.S. PATENT DOCUMENTS

2002/0053260 A1 5/2002 Nakon
2011/0072936 A1 3/2011 Narisako et al.

FOREIGN PATENT DOCUMENTS

CN 101942563 A 1/2011
CN 102031374 B 3/2013
CN 101942563 B 7/2013
CN 110494576 A 11/2019
CN 111041203 A 4/2020
CN 111268750 A 6/2020
CN 111592459 A 8/2020

OTHER PUBLICATIONS

Abstract and computer-generated translation of CN 111041203 (A) (Applicants: Xiamen Tungsten Co Ltd; Inventors: Wang Yanliang, Wang Yabing, Lin Jinchi), originally published on Apr. 21, 2020. (Year: 2020).*
Abstract and computer-generated translation of CN 111268750 (A) (Applicants: Li Chengwen, Luo Ji; Inventors: Li Chengwen, Luo Ji), originally published on Jun. 12, 2020. (Year: 2020).*
International Search Report mailed Sep. 26, 2021, for Application No. PCT/CN2021/105653 (four (4) pages).
Canadian Office Action in CA Application No. 3192895 dated Jul. 18, 2025, 4 pages.
Extended European Search Report in EP Application No. 21868241.7 dated Jun. 6, 2025, 11 pages.
Jiang et al, "Physical Chemistry of Hydrometallurgical Processes," 1984.
Wu et al, "Tantalum and Niobium Metallurgy," Central South University Press, Oct. 2001.
Ma "Extractive Metallurgy," 2009.
Fu et al, "Principles of Non-Ferrous Metallurgy." 2023.
Chinese Notice of Rejection for Application No. 202010986175 dated Jun. 29, 2023.

* cited by examiner

*Primary Examiner* — Vanessa T. Luk
(74) *Attorney, Agent, or Firm* — KDW FIRM PLLC

(57) ABSTRACT

The present application provides a method for separating nickel from lithium, comprising: (1) performing a saponification reaction on an extraction reagent and an alkaline compound to obtain a saponified extraction agent, wherein the extraction reagent comprises a specific carboxylic acid compound; (2) performing extraction and layering on a nickel-lithium feed liquid by using the saponified extraction agent obtained at step (1), so as to obtain a loaded organic phase and a raffinate water phase; and (3) using a back extraction agent to perform back extraction on the loaded organic phase obtained at step (2), so as to obtain a metal ion enrichment solution and a regenerated organic phase.

9 Claims, No Drawings

METHOD FOR SEPARATING NICKEL FROM LITHIUM, AND APPLICATION THEREOF

TECHNICAL FIELD

The present application belongs to the technical field of metal ion separation and purification, and relates to a method for separating nickel and lithium and use thereof.

BACKGROUND

Currently, lithium-ion batteries have been widely used in various fields, and especially, with the increase in new energy vehicles, the number of waste lithium-ion batteries is gradually increasing year by year. According to the survey, more than one billion lithium-ion batteries are discarded worldwide every year. It is important work for resource regeneration to retreat the waste lithium-ion batteries and separate and recover various metals therein. In addition, the electrode materials of waste lithium-ion batteries may cause serious pollution once enter the environment. Therefore, the recovery and reuse of precious metals in waste lithium-ion batteries can both protect the environment and save resources, showing a good economic prospect.

The main methods to recover nickel and other precious metals from waste lithium-ion batteries are incineration and hydrometallurgy. The application of incineration is limited due to complex equipment, high energy consumption and pollution; the hydrometallurgy is simple, easy and low in cost, and has a promising application prospect. One of the key technologies in hydrometallurgy is how to separate the metal ions effectively. The existing hydrometallurgy process for separating metal ions mainly includes chemical precipitation, membrane separation technology, ion exchange method, adsorption method and solvent extraction method.

CN111018204A discloses a method for treating electroplating wastewater by combining chemical precipitation method and membrane separation method, in which the electroplating wastewater is treated by chemical precipitation method and then treated by electrodialysis membrane separation. If the concentration of heavy metal ions such as chromium, copper, zinc and nickel is less than 5 mg/L after the chemical precipitation method, the wastewater can be discharged. Compared with electroplating wastewater treatment by the traditional chemical method, the oxidizing agent amount is reduced by 40%, the reducing agent amount is reduced by 50%, and the electroplating sludge amount is reduced by 50%, and the disclosed method has advantages of low cost and simple operation. However, due to the influence of precipitant selection and environment, the separation effect is often not ideal, and further treatment of the precipitation is required, otherwise secondary pollution may be easily caused.

CN110527836A discloses a method for recovering valuable metals from waste nickel-cobalt-manganese lithium-ion batteries by ion exchange method. The waste nickel-cobalt-manganese lithium-ion batteries is disassembled, discharged and crushed and then subjected to leaching, copper is removed from the leachate by displacement with nickel powders or cobalt powders, and iron and aluminum are removed by hydrolysis with alkaline solution of valuable metals as a neutralizer; the chelating resin is regenerated with lithium hydroxide solution and backwashed with sulfuric acid to obtain a nickel-cobalt-manganese mixture; the lithium in the solution after resin adsorption is recovered in the form of lithium hydroxide. This method realizes battery stripping and leaching in one step, no impurity elements will be introduced during the impurity removal of leachate and separation and extraction of the valuable metals, and it is avoid that lithium is adsorbed into the nickel-cobalt-manganese solution and a high sodium ion content of the solution is brought by the use of sodium hydroxide; the recovery rate of nickel, cobalt and manganese is more than 98%, and the lithium recovery rate is more than 90%. However, the ion exchange chelating resin used is prone to oxidation failure, and frequent regeneration will cause a high operation cost of the overall process as well as high cost, which is not conducive to industrial application.

Solvent extraction is characterized by high selectivity, continuous and automatic operation, and easy industrialization, which has become a hot research topic currently for the recovery of nickel and other precious metals from waste batteries. CN109055746A discloses a method for recovering valuable metals from high-nickel lithium-ion battery positive electrode waste. Firstly, manganese and cobalt are selectively extracted from a high-nickel leachate by solvent extraction, and the extraction system is P507 or P204 or Cyanex272 with sulfonated kerosene; then nickel and lithium are further separated from the raffinate by solvent extraction; finally, adopting the selective oxidation precipitation method to precipitate the manganese ions from the extracted manganese and cobalt so as to achieve the separation of manganese and cobalt from each other. This method has the advantages of simple system, good separation effect and simple operation process steps, and realizes the effective recovery of all components including nickel, cobalt, manganese and lithium resources from high-nickel lithium-ion battery waste. However, the extractant used in this method brings a lot of lithium when extracting nickel, and a large amount of acid is required to wash down the lithium, which results in a high extraction cost of nickel and a low recovery rate, and the separation efficiency of nickel and lithium also needs to be improved.

Therefore, it has been a research emphasis in the art to develop a method for separating nickel and lithium with low acid consumption, high extraction efficiency and low cost for improving the separation efficiency and recovery rate of nickel and lithium.

SUMMARY

An object of the present application is to provide a method for separating nickel and lithium and use thereof. The separation method utilizes a carboxylic acid compound having a specific structure as an extractant, combines saponification, extraction and other processes, and successfully separates nickel and lithium in the nickel-lithium feed solution. The whole separation process has the advantages of simple operation, environmental friendliness and low cost.

To achieve the object of the present application, the present application adopts the technical solutions below.

In a first aspect, the present application provides a method for separating nickel and lithium, and the separation method includes the following steps:

(1) subjecting an extractant and an alkaline compound to saponification reaction to obtain a saponified extractant;

the extractant includes any one or a combination of at least two of carboxylic acid compounds having a structure shown in Formula I:

Formula I

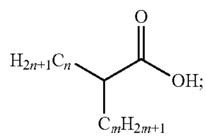

in which m and n are each independently selected from integers from 1 to 21, such as 1, 2, 3, 4, 5, 6, 7, 8, 9, 10, 11, 12, 13, 14, 15, 16, 17, 18, 19, 20 or 21, and $10 \leq m+n \leq 22$;

(2) subjecting a nickel-lithium feed solution to extraction by using the saponified extractant obtained from step (1), and performing layer separation to obtain a loaded organic phase and a raffinate aqueous phase; the raffinate aqueous phase includes lithium ions; and (3) subjecting the loaded organic phase obtained from step (2) to back extraction with a back extractant to obtain a metal ion enriched solution and a regenerated organic phase; the metal ion enriched solution includes nickel ions.

The method for separating nickel and lithium provided by the present application mainly includes three steps. In step (1), the extractant and the alkaline compound are subjected to saponification reaction, and the acidity of the extractant should not be too high; the carboxylic acid compound included in the extractant has a carbon chain length of more than or equal to 10 and less than or equal to 22, and any one or a combination of at least two of the carboxylic acid compounds in this range maintain a liquid state; in step (2), the nickel-lithium feed solution is extracted with the saponified extractant, and subjected to layer separation to obtain the loaded organic phase and the raffinate aqueous phase, in which the raffinate aqueous phase includes lithium ions, and nickel and lithium are separated in this step; in step (3), the loaded organic phase is subjected to back extraction with the back extractant, on the one hand, to obtain a metal ion enriched solution containing nickel ions, and on the other hand, to regenerate the organic phase, facilitating recycling to reduce costs. The whole separation process has low acid consumption, simple operation, low cost, and good separation effect of nickel and lithium.

Optionally, m and n are each independently an integer from 2 to 20, such as 3, 4, 5, 6, 7, 8, 9, 10, 11, 12, 13, 14, 15, 17, 18 or 19.

Optionally, m and n are each independently an integer from 2 to 10.

As an optional technical solution of the present application, m and n of the carboxylic acid compound are each independently an integer from 2 to 10, in which case the obtained extractant has the highest extraction efficiency. On the one hand, if m and n are too high, the non-polar group in the carboxylic acid compound will be too large, and the mobility will be bad, which affects the extraction efficiency; on the other hand, if m and n are too low, the solubility of the obtained carboxylic acid compound in water will be too high, and thus it is difficult to obtain the organic phase and the raffinate aqueous phase by phase separation, which affects the extraction effect.

Optionally, the carboxylic acid compound is selected from any one or a combination of at least two of the following compounds:

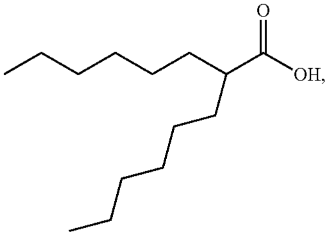

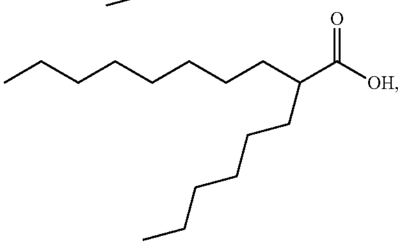

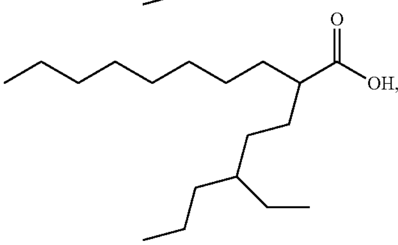

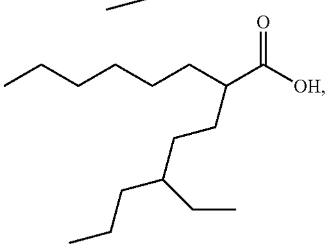

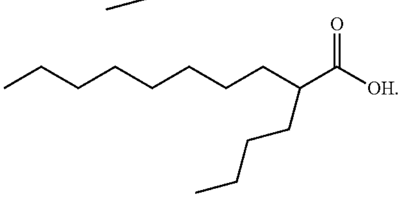

Optionally, the extractant further includes a diluent.

Optionally, the diluent includes any one or a combination of at least two of diluent Escaid 110, solvent oil, toluene, hexane, heptane, dodecane or kerosene; the diluent is further optionally kerosene and/or dodecane.

Optionally, the kerosene includes sulfonated kerosene.

Optionally, the carboxylic acid compound in the extractant has a volume percentage of 5-30%, such as 6%, 7%, 9%, 11%, 13%, 15%, 17%, 19%, 21%, 23%, 25%, 27% or 29%, and specific point values between the above point values are also included, and for reasons of space and brevity, the specific point values included in the range will not be listed exhaustively in the present application.

Optionally, the alkaline compound in step (1) includes an inorganic base.

Optionally, the inorganic base includes any one or a combination of at least two of sodium hydroxide, potassium hydroxide or aqueous ammonia.

Optionally, the saponified extractant and the nickel-lithium feed solution in step (2) have a volume ratio of 1:(0.1-10), such as 1:0.5, 1:1, 1:1.5, 1:2, 1:2.5, 1:3, 1:3.5, 1:4, 1:4.5, 1:5, 1:5.5, 1:6, 1:6.5, 1:7, 1:7.5, 1:8, 1:8.5, 1:9 or 1:9.5.

As an optional technical solution of the present application, the saponified extractant and the nickel-lithium feed solution in step (2) have a volume ratio of 1:(0.1-10) in the present application. If the volume ratio is too large, the nickel-lithium feed solution will have too little volume share and be difficult to stir uniformly when mixed; if the volume ratio is too small, the nickel-lithium feed solution will have too much volume share and thus much waste water will be produced, and it's also difficult to mix the system uniformly.

Optionally, the raffinate aqueous phase in step (2) has a pH of 5.5-7.5, such as 5.6, 5.8, 6.0, 6.4, 6.7, 7.0, 7.1, 7.2 or 7.4, and specific point values between the above point values are also included, and for reasons of space and brevity, the specific point values included in the range will not be listed exhaustively in the present application.

As an optional technical solution of the present application, the raffinate aqueous phase has a pH of 5.5-7.5. If the pH value is too small, the nickel extraction rate will be low; if the pH value is too large, more lithium will be extracted from the nickel-lithium feed solution to the organic phase, which increases the washing cost.

Optionally, the extraction in step (2) is carried out with stirring.

Optionally, the stirring is carried out at 100-250 rpm/min, such as 120 rpm/min, 140 rpm/min, 150 rpm/min, 160 rpm/min, 180 rpm/min, 200 rpm/min, 220 rpm/min or 240 rpm/min, and specific point values between the above point values are also included, and for reasons of space and brevity, the specific point values included in the range will not be listed exhaustively in the present application.

Optionally, the extraction is carried out for 5-30 min, such as 8 min, 10 min, 12 min, 15 min, 18 min, 20 min, 22 min, 25 min, or 28 min, and specific point values between the above point values are also included, and for reasons of space and brevity, the specific point values included in the range will not be listed exhaustively in the present application.

Optionally, the extraction in step (2) is multi-stage countercurrent extraction.

Optionally, the multi-stage countercurrent extraction has 2-20 stages, such as 3 stages, 4 stages, stages, 6 stages, 7 stages, 8 stages, 9 stages, 10 stages, 12 stages, 15 stages, 17 stages, 18 stages or 19 stages.

Optionally, the extraction is carried out at 10-35° C., such as 12° C., 15° C., 18° C., 20° C., 22° C., 25° C., 28° C., 30° C., 32° C. or 34° C., and specific point values between the above point values are also included, and for reasons of space and brevity, the specific point values included in the range will not be listed exhaustively in the present application.

Optionally, the layer separation in step (2) is carried out for 5-50 min, such as 10 min, 15 min, 20 min, 25 min, 30 min, 35 min, 40 min or 45 min, and specific point values between the above point values are also included, and for reasons of space and brevity, the specific point values included in the range will not be listed exhaustively in the present application.

Optionally, the back extractant includes an inorganic acid.

Optionally, the inorganic acid includes any one or a combination of at least two of hydrochloric acid, nitric acid or sulfuric acid.

Optionally, the inorganic acid in the back extractant has a concentration of 0.5-4 mol/L, such as 0.6 mol/L, 0.9 mol/L, 1.2 mol/L, 1.5 mol/L, 1.8 mol/L, 2.1 mol/L, 2.4 mol/L, 2.7 mol/L, 3 mol/L, 3.3 mol/L, 3.6 mol/L or 3.9 mol/L, and specific point values between the above point values are also included, and for reasons of space and brevity, the specific point values included in the range will not be listed exhaustively in the present application.

Optionally, the back extraction in step (3) is carried out for 2-10 times, such as 3 times, 4 times, times, 6 times, 8 times or 9 times.

Optionally, the back extractant and the loaded organic phase have a volume ratio of 1:(0.1-10), such as 1:0.5, 1:1, 1:1.5, 1:2, 1:2.5, 1:3, 1:3.5, 1:4, 1:4.5, 1:5, 1:5.5, 1:6, 1:6.5, 1:7, 1:7.5, 1:8, 1:8.5, 1:9 or 1:9.5.

Optionally, the method further includes washing the loaded organic phase obtained from step (2) before the back extraction.

Optionally, the washing has 2-8 stages, such as 3 stages, 4 stages, 5 stages, 6 stages or 7 stages.

Optionally, the washing includes inorganic acid washing.

Optionally, the inorganic acid has a pH of 1-2, such as 1.2, 1.3, 1.4, 1.5, 1.6, 1.7, 1.8 or 1.9, and specific point values between the above point values are also included, and for reasons of space and brevity, the specific point values included in the range will not be listed exhaustively in the present application.

Optionally, the separation method specifically includes the following steps:

(1) subjecting an extractant and an alkaline compound to saponification reaction to obtain a saponified extractant; the extractant includes a diluent and a carboxylic acid compound having a structure shown in Formula I:

Formula I

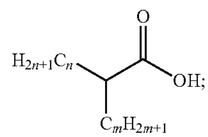

in which m and n are each independently selected from integers from 1 to 21, and 10≤m+n≤22;

(2) using the saponified extractant obtained from step (1) to extract a nickel-lithium feed solution with a pH of 4-10 according to a volume ratio of 1:(0.1-10), and performing layer separation to obtain a loaded organic phase containing nickel ions and a raffinate aqueous phase containing lithium ions with a pH of 5.5-7.5; and (3) washing the loaded organic phase obtained from step (2) with an inorganic acid, then subjecting the loaded organic phase to back extraction with a back extractant to obtain a metal ion enriched solution containing nickel ions and a regenerated organic phase; the back extractant and the loaded organic phase have a volume ratio of 1:(0.1-10).

In a second aspect, the present application provides use of the separation method according to the first aspect, and the use is separating nickel and lithium in a battery waste solution.

Optionally, the battery is a nickel lithium-ion battery.

In a third aspect, the present application provides use of an extractant containing a carboxylic acid compound having a structure shown in Formula I in separating nickel and lithium.

Compared to the prior art, the present application has the beneficial effects below.

In the method for separating nickel and lithium provided by the present application, an extractant containing a carboxylic acid compound having a specific structure is first saponified to obtain a saponified extractant, then a nickel-lithium feed solution is extracted by the saponified extractant to separate nickel and lithium, and finally an organic phase containing nickel after the extraction is subjected to back extraction to obtain a regenerated organic phase and a metal ion enriched solution. The whole process is easy to operate, low in acid consumption, and environmentally friendly. The nickel purity of the metal ion enriched solution obtained from the separation method of the present application is as high as 99.9%, and the nickel content of the raffinate aqueous phase is only 0.2-0.5 mg/L, and compared with the method for separating nickel and lithium in the prior art, the nickel purity of the obtained metal ion enriched solution is increased by 0.4-1.4%, and the nickel content of the raffinate aqueous phase is reduced by 50-93%; in addition, the extractant used in the present application is low-solubility, stable and recyclable after regeneration, which is conducive to cost reduction and suitable for large-scale industrial application.

DETAILED DESCRIPTION

The technical solutions of the present application are further described below through embodiments. It should be apparent to those skilled in the art that the embodiments are only used for a better understanding of the present application and should not be regard as a specific limitation of the present application.

Preparation Example 1

A carboxylic acid compound BC196 has the following structural formula:

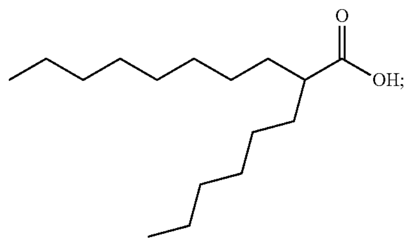 [SMILES: CCCCCCCCC(CCCCCC)C(=O)O]

its preparation method includes the steps below.

200 mL of hexadecanol and 300 mL of acetone were added into a round bottom flask. Then, Jones reagent was added dropwise, and a temperature of the mixed reagent in the round bottom flask was monitored simultaneously. When the temperature of the mixed reagent in the round bottom flask reached 14° C., a drip feeding speed was slowed down; when the temperature of the mixed reagent in the round bottom flask rose to 19° C., the drip feeding was stopped. An intermediate product was obtained through thin layer chromatography, dissolved with dichloromethane, and then washed with dilute acid, dilute alkali and distilled water separately, and after an oil phase and an aqueous phase were separated, the dichloromethane was removed by rotary evaporation to obtain the carboxylic acid compound BC196.

The carboxylic acid compound BC196 has the characterization results below.

$^{13}$C NMR (101 MHz, $CDCl_3$) δ 183.50 (s), 77.43-76.83 (m), 76.67 (s), 45.65 (s), 32.31-31.38 (m), 29.37 (dd, J=25.0, 8.9 Hz), 27.35 (d, J=3.4 Hz), 22.63 (d, J=5.9 Hz), 14.02 (d, J=4.4 Hz);

$^{1}$H NMR (400 MHz, $CDCl_3$) δ 2.24 (1H), 1.70 (4H), 1.45 (20H), 0.85 (6H); the hydrogen of the carboxyl group is not shown;

MS: 256.2.

Example 1

A method for separating nickel and lithium has the specific steps below.

(1) The carboxylic acid compound BC196 obtained from Preparation Example 1 was dissolved in diluent Escaid 110, and BC196 in Escaid 110 had a volume percentage of 25%; then a NaOH solution with a concentration of 10 mol/L was added to obtain a saponified extractant with a saponification degree of 23%, and the saponified extractant was used as an organic phase system.

(2) A nickel-lithium feed solution as an aqueous phase system (containing 1.13 g/L nickel and 5.042 g/L lithium, and pH=4.81; obtained from a waste lithium-ion battery positive electrode material leachate after impurity removal and cobalt-manganese extraction) and the saponified extractant obtained from step (1) flowed into an extractor from the two ends of the extractor, respectively, (the saponified extractant and the nickel-lithium feed solution had a volume ratio of 1:5) for multi-stage countercurrent extraction; the extraction was carried out at 25° C. for 15 min with stirring at 150 rpm/min, and the extraction had 9 stages; the system was allowed to stand for 15 min, and subjected to layer separation to obtain a loaded organic phase and a raffinate aqueous phase containing lithium ions with a pH of 6.

(3) The loaded organic phase obtained from step (2) was subjected to 3-stage countercurrent washing by using sulfuric acid with a pH of 1, and the sulfuric acid with a pH of 1 and the loaded organic phase had a volume ratio of 1:5; then, the loaded organic phase was subjected to back extraction for 3 times by using sulfuric acid with a concentration of 2 mol/L, and the sulfuric acid with a concentration of 2 mol/L and the loaded organic phase had a volume ratio of 1:10; a metal ion enriched solution and a regenerated organic phase were obtained.

Example 2

A method for separating nickel and lithium has the specific steps below.

(1) The carboxylic acid compound BC196 obtained from Preparation Example 1 was dissolved in diluent Escaid 110, and BC196 in Escaid 110 had a volume percentage of 25%; then a NaOH solution with a concentration of 10 mol/L was added to obtain a saponified extractant with a saponification degree of 23%, and the saponified extractant was used as an organic phase system.

(2) A nickel-lithium feed solution as an aqueous phase system (containing 1.13 g/L nickel and 5.042 g/L lithium, and pH=4.81; obtained from a waste lithium-ion battery positive electrode material leachate after impurity removal and cobalt-manganese extraction) and the saponified extractant obtained from step (1) flowed into an extractor from the two ends of the extractor, respectively, (the saponified extractant and the nickel-lithium feed solution had a volume ratio of 1:5) for multi-stage countercurrent extraction; the extraction was carried out at 25° C. for 10 min with stirring at 200 rpm/min, and the extraction had 6 stages;

the system was allowed to stand for 20 min, and subjected to layer separation to obtain a loaded organic phase and a raffinate aqueous phase containing lithium ions with a pH of 6.5.

(3) The loaded organic phase obtained from step (2) was subjected to 4-stage countercurrent washing by using sulfuric acid with a pH of 1.2, and the sulfuric acid with a pH of 1 and the loaded organic phase had a volume ratio of 1:5; then, the loaded organic phase was subjected to back extraction for 3 times by using sulfuric acid with a concentration of 2 mol/L, and the sulfuric acid with a concentration of 2 mol/L and the loaded organic phase had a volume ratio of 1:10; a metal ion enriched solution and a regenerated organic phase were obtained.

Example 3

A method for separating nickel and lithium has the specific steps below.

(1) The carboxylic acid compound BC196 obtained from Preparation Example 1 was dissolved in sulfonated kerosene, and BC196 in sulfonated kerosene had a volume percentage of 25%; then a NaOH solution with a concentration of 8 mol/L was added to obtain a saponified extractant with a saponification degree of 23%, and the saponified extractant was used as an organic phase system.

(2) A nickel-lithium feed solution as an aqueous phase system (containing 1.13 g/L nickel and 5.042 g/L lithium, and pH=4.81; obtained from a waste lithium-ion battery positive electrode material leachate after impurity removal and cobalt-manganese extraction) and the saponified extractant obtained from step (1) flowed into an extractor from the two ends of the extractor, respectively, (the saponified extractant and the nickel-lithium feed solution had a volume ratio of 1:5) for multi-stage countercurrent extraction; the extraction was carried out at 25° C. for 15 min with stirring at 180 rpm/min, and the extraction had 4 stages; the system was allowed to stand for 20 min, and subjected to layer separation to obtain a nickel ion-loaded organic phase and a raffinate aqueous phase containing lithium ions with a pH of 7.

(3) The loaded organic phase obtained from step (2) was subjected to 5-stage countercurrent washing by using sulfuric acid with a pH of 1.2, and the sulfuric acid with a pH of 1.2 and the loaded organic phase had a volume ratio of 1:5; then, the loaded organic phase was subjected to back extraction for 3 times by using sulfuric acid with a concentration of 3 mol/L, and the sulfuric acid with a concentration of 3 mol/L and the loaded organic phase had a volume ratio of 1:10; a metal ion enriched solution and a regenerated organic phase were obtained.

Example 4

A method for separating nickel and lithium differs from Example 1 only in that the sulfuric acid with a pH of 1 in step (3) was replaced with hydrochloric acid with a pH of 1, and the sulfuric acid of 2 mol/L was replaced with hydrochloric acid of 4 mol/L; other component amounts and experimental conditions were the same as in Example 1.

Comparative Example 1

A method for separating nickel and lithium differs from Example 1 only in that the carboxylic acid compound BC196 in step (1) was replaced with an equal amount of extractant P507 (2-ethylhexyl phosphonic acid mono-2-ethylhexyl ester); other component amounts and experimental conditions were the same as in Example 1.

Comparative Example 2

A method for separating nickel and lithium differs from Example 1 only in that the carboxylic acid compound BC196 in step (1) was replaced with an equal amount of extractant Versatic 10 (tert-decanoic acid); other component amounts and experimental conditions were the same as in Example 1.

Performance Test

Nickel content: the nickel contents of the metal ion enriched solution and the raffinate aqueous phase were determined by inductively coupled plasma-optical emission spectrometry (ICP-OES); and a mass percentage of the nickel in all metals in the metal ion enriched solution was calculated to obtain a nickel purity of the metal ion enriched solution.

The raffinate aqueous phases and the metal ion enriched solutions obtained from step (2) of the extraction method in Examples 1-4 and Comparative Example 1-2 were tested according to the above test method, and the results are shown in Table 1.

TABLE 1

| | Nickel Purity of Metal Ion Enriched Solution (%) | Nickel Content of Raffinate Aqueous Phase (mg/L) |
|---|---|---|
| Example 1 | 99.9 | 0.2 |
| Example 2 | 99.9 | 0.5 |
| Example 3 | 99.9 | 0.4 |
| Example 4 | 99.9 | 0.5 |
| Comparative Example 1 | 98.5 | 3.0 |
| Comparative Example 2 | 99.5 | 1.0 |

It can be seen from Table 1 that the method for separating nickel and lithium provided by the present application has better separation effect compared with the prior art; specifically, the nickel purity of the metal ion enriched solution obtained from Examples 1-4 is as high as 99.9%, and the nickel content of the raffinate aqueous phase is only 0.2-0.5, and compared with the method for separating nickel and lithium in the prior art (Comparative Example 1 and Comparative Example 2), the nickel purity of the obtained metal ion enriched solution is increased by 0.4-1.4%, and the nickel content of the raffinate aqueous phase is reduced by 50-93%, indicating that the method for separating nickel and lithium provided by the present application is more effective in separating nickel and lithium.

The applicant has stated that a method for separating nickel and lithium and use thereof are illustrated through the above embodiments in the present application, but the present application is not limited to the above process steps, which means the present application is not necessarily rely on the above process steps to be implemented.

What is claimed is:

1. A method for separating nickel and lithium, comprising:

(1) subjecting an extractant and an alkaline compound to saponification reaction to obtain a saponified extractant;

the extractant comprising a carboxylic acid compound selected from any one or a combination of at least two of the following compounds:

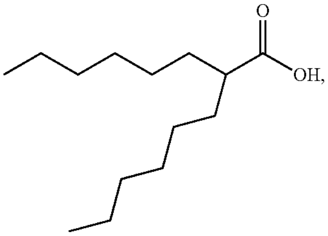,

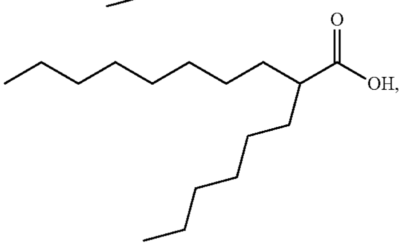,

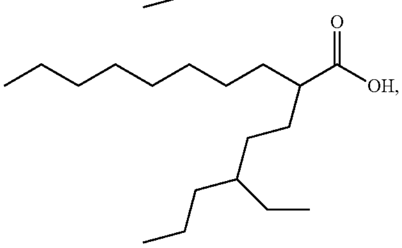,

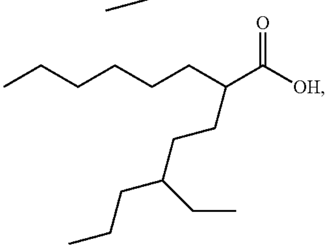,

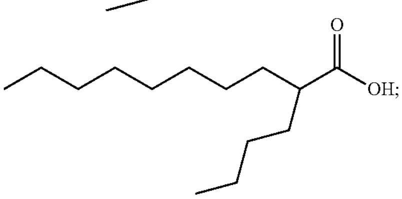;

(2) subjecting a nickel-lithium feed solution to extraction by using the saponified extractant obtained from step (1), and performing layer separation to obtain a loaded organic phase and a raffinate aqueous phase, the raffinate aqueous phase comprising lithium ions; and (3) subjecting the loaded organic phase obtained from step (2) to back extraction with a back extractant to obtain a metal ion enriched solution and a regenerated organic phase, the metal ion enriched solution comprising nickel ions.

2. The separation method according to claim 1, wherein the extractant further comprises a diluent;

wherein the diluent comprises any one or a combination of at least two of solvent oil, toluene, hexane, heptane, dodecane or kerosene;

wherein the kerosene comprises sulfonated kerosene; and wherein the carboxylic acid compound in the extractant has a volume percentage of 5-30%.

3. The separation method according to claim 1, wherein the alkaline compound in step (1) comprises an inorganic base; and wherein the inorganic base comprises any one or a combination of at least two of sodium hydroxide, potassium hydroxide or aqueous ammonia.

4. The separation method according to claim 1, wherein the saponified extractant and the nickel-lithium feed solution in step (2) have a volume ratio of 1:(0.1-10);

wherein the raffinate aqueous phase in step (2) has a pH of 5.5-7.5;

wherein the extraction in step (2) is carried out with stirring;

wherein the stirring is carried out at 100-250 rpm/min;

wherein the extraction in step (2) is carried out for 5-30 min;

wherein the extraction in step (2) is multi-stage countercurrent extraction;

wherein the multi-stage countercurrent extraction has 2-20 stages;

wherein the extraction in step (2) is carried out at 10-35° C.; and wherein the layer separation in step (2) is carried out for 5-50 min.

5. The separation method according to claim 1, wherein the back extractant comprises an inorganic acid;

wherein the inorganic acid comprises any one or a combination of at least two of hydrochloric acid, nitric acid or sulfuric acid; and wherein the inorganic acid in the back extractant has a concentration of 0.5-4 mol/L.

6. The separation method according to claim 1, wherein the back extraction in step (3) is carried out for 2-10 times; and wherein the back extractant and the loaded organic phase have a volume ratio of 1:(0.1-10.

7. The separation method according to claim 1, which specifically comprises:

(1) subjecting an extractant and an alkaline compound to saponification reaction to obtain a saponified extractant with a saponification degree of 0.8-40%, the extractant comprising a diluent and a carboxylic acid compound selected from any one or a combination of at least two of the following compounds:

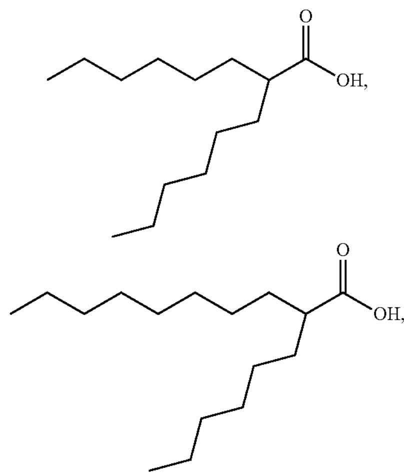

-continued

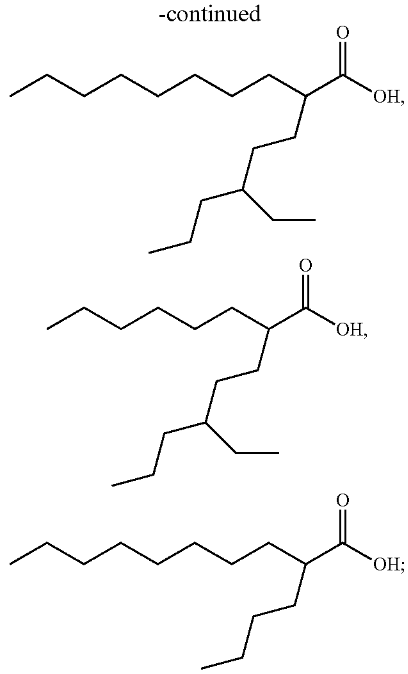

(2) using the saponified extractant obtained from step (1) to extract a nickel-lithium feed solution with a pH of 4-10 according to a volume ratio of 1:(0.1-10), and performing layer separation to obtain a loaded organic phase containing nickel ions and a raffinate aqueous phase containing lithium ions with a pH of 5.5-7.5; and (3) washing the loaded organic phase obtained from step (2) with an inorganic acid, then subjecting the loaded organic phase to back extraction with a back extractant to obtain a metal ion enriched solution containing nickel ions and a regenerated organic phase; the back extractant and the loaded organic phase having a volume ratio of 1:(0.1-10).

8. The separation method according to claim 1, wherein the method further comprises washing the loaded organic phase obtained from step (2) before the back extraction;

wherein the washing has 2-8 stages;

wherein the washing comprises inorganic acid washing;

wherein the inorganic acid has a pH of 1-2.

9. A method for separating nickel and lithium in a battery waste solution, comprising using the separation method according to claim 1; and wherein the battery is a nickel lithium-ion battery.

* * * * *